July 28, 1970     H. W. COPONY     3,521,846
LIQUID POURING DEVICE
Filed May 24, 1968     2 Sheets-Sheet 1
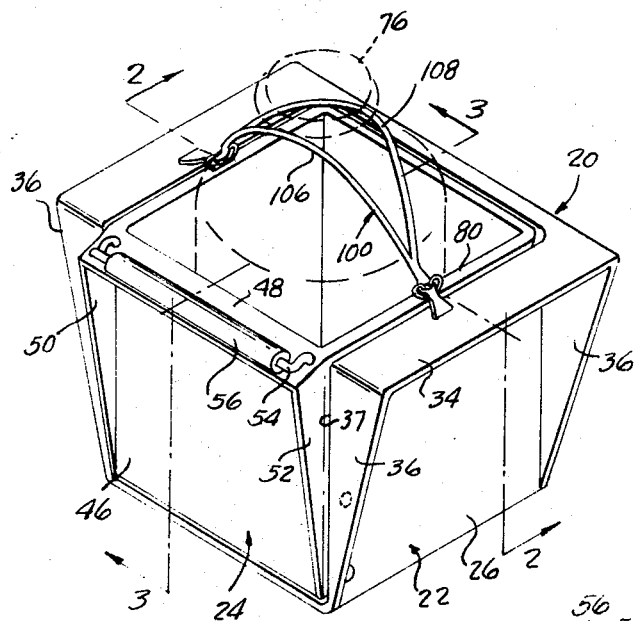
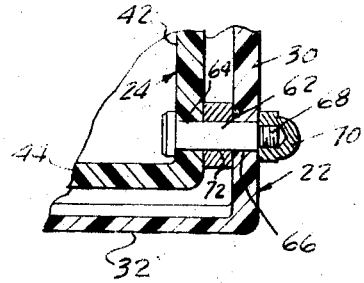
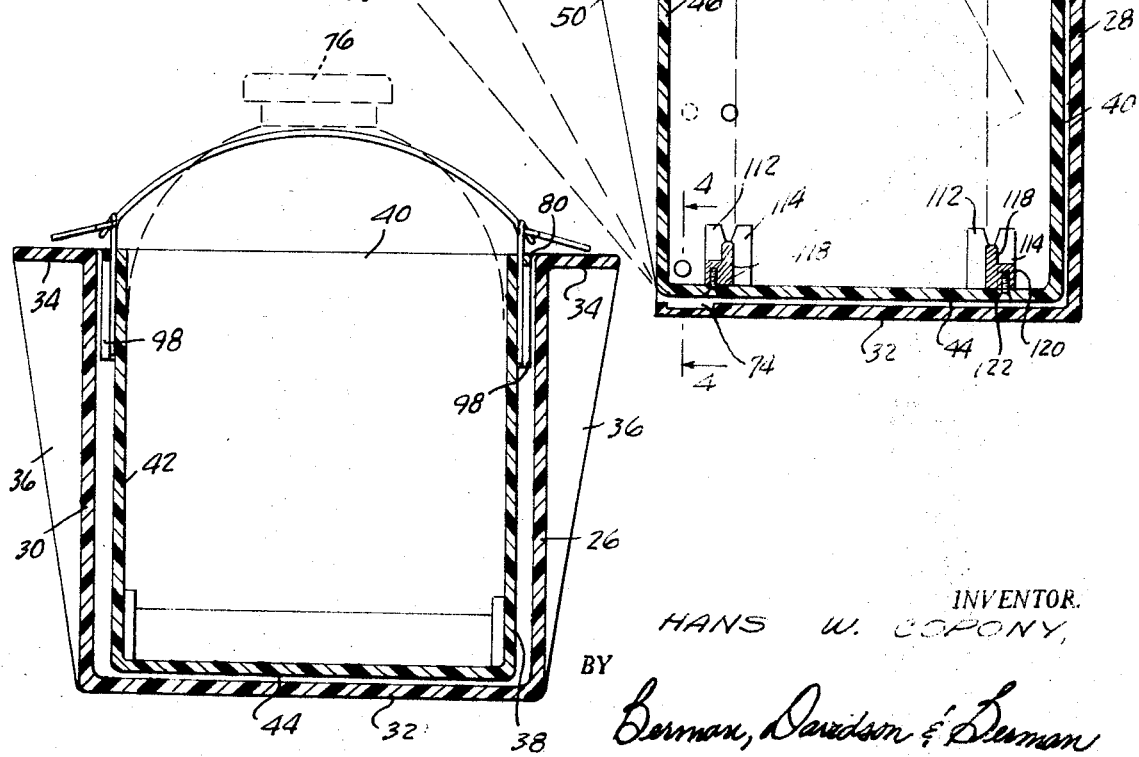
INVENTOR.
HANS W. COPONY,
BY
Berman, Davidson & Berman
ATTORNEYS July 28, 1970   H. W. COPONY   3,521,846
LIQUID POURING DEVICE
Filed May 24, 1968   2 Sheets-Sheet 2
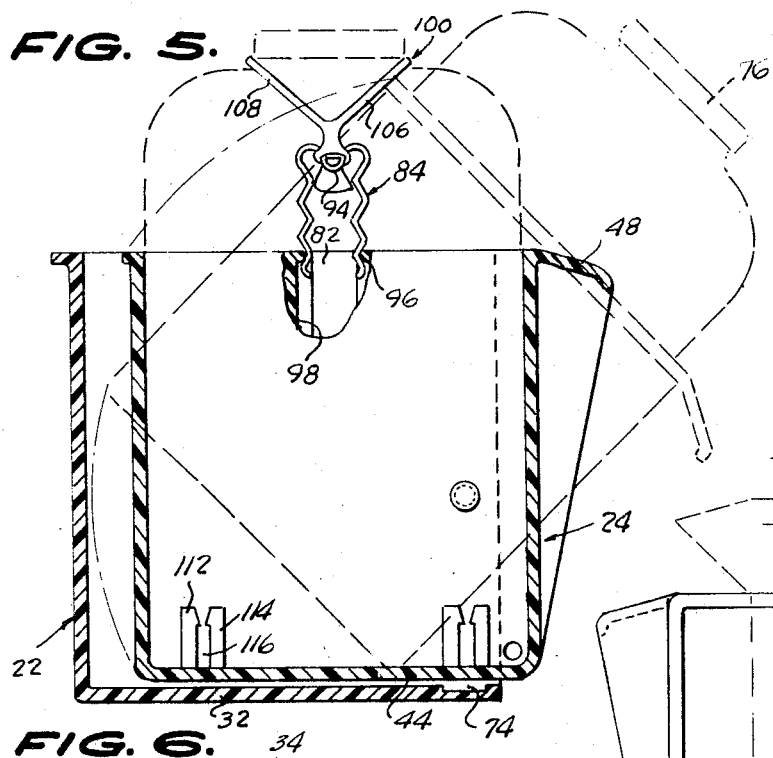
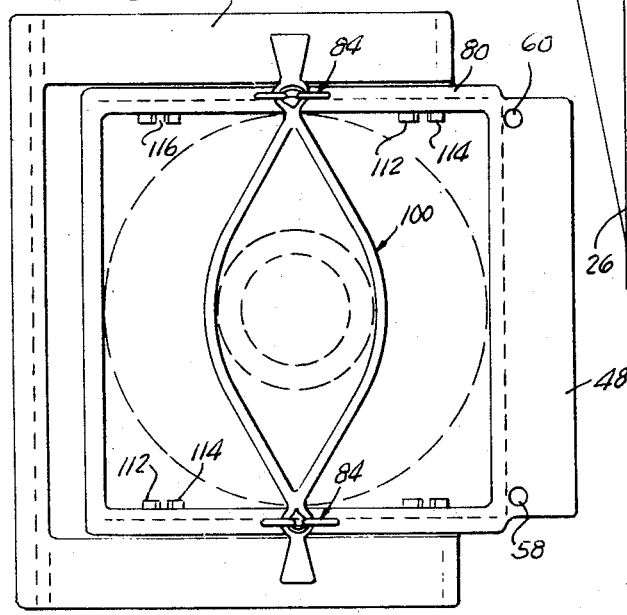
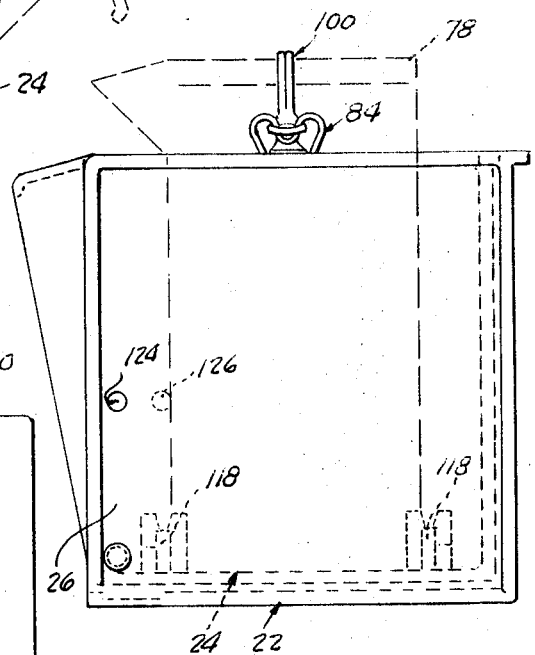
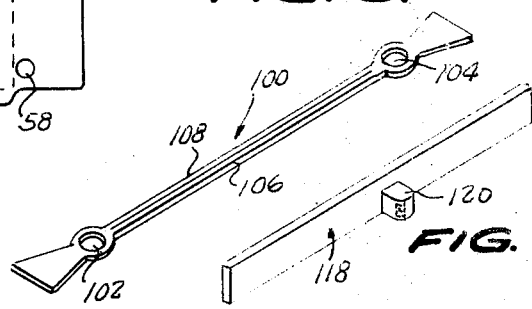
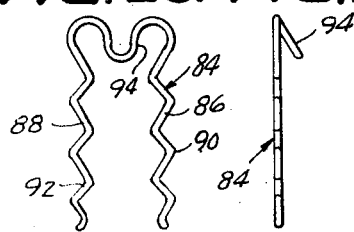
INVENTOR.
HANS W. COPONY,
BY
Berman, Davidson & Berman
ATTORNEYS

United States Patent Office 3,521,846
Patented July 28, 1970

---

3,521,846
LIQUID POURING DEVICE
Hans W. Copony, 2733 Shippen Ave.,
Louisville, Ky. 40206
Filed May 24, 1968, Ser. No. 731,793
Int. Cl. A47f 5/12
U.S. Cl. 248—139                                      6 Claims

---

ABSTRACT OF THE DISCLOSURE

Apparatus for pouring liquid from an open container without handling the container. The liquid container is clamped in a receptacle shell which is pivotally connected to an outer shell for tilting movement with respect thereto. Alternate pivot points are provided between the shells for limiting the maximum attainable height of the liquid container during its pivotal movement whereby the apparatus can be used in a confined space, such as between refrigerator shelves. Means are provided in the receptacle shell for restraining lateral movement of the bottom of the liquid container, if necessary.

---

This invention relates to a device designed to facilitate the pouring of liquids housed within bottles or paper containers.

It is often awkward to pick up a large container filled with a liquid, such as a milk bottle or carton, and tilt the container to dispense the contents. The container is usually heavy or condensation of liquid on its exterior surface may make it slippery.

Accordingly, it is an object of this invention to provide a device for holding and tilting a liquid container to effect dispensing of its contents, eliminating the necessity of handling the container.

A further object of this invention is to provide a device of the character indicated which is adjustable to securely hold different size containers.

A still further object of this invention is to provide a device of the character indicated which may be operated while remaining in a refrigerator or placed on a table, and whose height is adjustable to enable the device to be operably tilted in a limited space, such as found in a refrigerator.

Another object of this invention is to provide a device of the character indicated which is sanitary to use and is easily disassembled for cleaning.

Further objects and advantages of the invention will become apparent from the following description and claims, and from the accompanying drawings, wherein:

FIG. 1 is a perspective view of my liquid pouring device;

FIG. 2 is a cross-sectional view taken substantially along the plane indicated by line 2—2 of FIG. 1;

FIG. 3 is a cross-sectional view taken substantially along the plane indicated by line 3—3 of FIG. 1;

FIG. 4 is an enlarged, fragmentary cross-sectional view, taken substantially along the plane indicated by line 4—4 of FIG. 3;

FIG. 5 is a cross-sectional view through a central plane of the liquid pouring device shown in FIG. 1, but illustrating an alternative manner of tilting the device;

FIG. 6 is a top plan view of the device shown in FIG. 5;

FIG. 7 is a side view in elevation of the device shown in FIG. 1, but illustrating the manner of holding a milk carton, rather than a bottle;

FIG. 8 is a perspective view of a retainer used to securely hold the container in the liquid pouring device;

FIG. 9 is a perspective view of an adaptor used in clamping a smaller size container in the liquid pouring device;

FIG. 10 is a front view in elevation of a hook used in connection with the retainer shown in FIG. 8; and FIG. 11 is a side view in elevation of the hook shown in FIG. 10, as seen from the left-hand side of FIG. 10.

Referring now to the drawings in detail, wherein like elements are designated by like numerals throughout the several views, the liquid pouring device of the present invention is generally designated by the numeral 20.

Liquid pouring device 20 includes an outer shell 22 tiltably supporting an inner shell 24. Outer and inner shells 22, 24 are formed from moldable plastic with rounded corners, and are seamless to facilitate cleaning and sanitizing.

Outer shell 22 includes integral side walls 26, 28 and 30, joined to a bottom wall 32. A flange 34 is joined to the top edges of sidewalls 26, 28 and 30 and is rigidified by upright triangular brackets 36. Opposite portions of flange 34 serve as handle elements for carrying the device 20.

Inner shell 24 is inserted into the interior of outer shell 22 through access opening 37 and includes integral side walls 38, 40 and 42, joined to a bottom wall 44. Inner shell 24 also includes a front side wall 46 integral with side walls 38, 40, 42 and bottom wall 44. Front wall 46 includes a forwardly and downwardly extending lip 48 secured to its top edge. Lip 48 is supported by upright triangular brackets 50, 52.

A spring wire handle element 54 having a roller 56 mounted thereon is inserted through spaced openings 58, 60 in lip 48. By pulling on roller 56, inner shell 24 can be tilted relative to outer shell 22 as will be described hereinafter.

In FIGS. 1 to 4 and 7, inner shell 24 is pivotally connected to outer shell 22 by pins 62 inserted through pairs of aligned openings 64, 66 in the inner and outer shells. Openings 64 are located in the extreme lower and forward corners of side walls 38, 42 of inner shell 24 and are aligned with openings 66 located in the extreme lower and forward corners of side walls 26, 30 of outer shell 22. Pins 62 are headed at their interior end and have a threaded portion 68 receiving a nut 70 at their exterior end. Washers 72 on pins 62 space the inner and outer shells.

By pulling on roller 56 inner shell 24 pivots about pins 62 relative to outer shell 22. A transverse groove 74 is cut along the width of bottom wall 32 of outer shell 22 to provide clearance for the pivotal motion of inner shell 24 relative to outer shell 22, as shown by the phantom lines in FIG. 3.

Side walls 38, 40, 42 and 46 of inner shell 24, along with bottom wall 44 form a receptacle for a liquid holding bottle 76 or paper container 78, the contents of which are adapted to be dispensed upon tilting inner shell 24. The interior of this receptacle should be large enough to hold the maximum size container contemplated for use with the device, such as a gallon milk jug or bottle 76.

In order to securely clamp bottle 76 in inner shell 24, the inner shell is provided with a small flange 80 connected to the top edge of its side walls 38, 40 and 42. Opposed portions of flange 80 have a slot 82 formed therethrough for receiving in sliding engagement a hook member 84.

Hook members 84 are formed from a single length of spring wire and include opposed legs 86, 88 having alternating peaks 90 and valleys 92. Legs 86, 88 are joined by U-shaped central portion 94 bent outwardly at an acute angle from the plane of legs 86, 88.

Legs 86, 88 of a hook member 84 are compressed towards each other and inserted through opposed slots 82 in flange 80. Beneath slots 82 and connected to the exterior surface of side walls 38, 42 are a pair of facing L-shaped brackets 96, 98, which serve as guides for hook members 84. After insertion of the hook members 84 into slots 82 to a desired depth, the members are released and a pair of opposed valleys 92 on legs 86, 88 will frictionally bind against the opposed edges of a slot 82. The depth of insertion depends upon the height of bottle 76 or paper container 78.

With the hook members 84 in place, a retainer 100 of elastic material having opposed ends provided with eyelets 102, 104 is connected to the opposed hook members. The eyelets 102, 104 are inserted over and around the U-shaped central portion 94 on hook members 84.

The portion of retainer 100, between eyelets 102, 104 is slit longitudinally to provide extensible straps 106, 108. Straps 106, 108 can be separated, if necessary, to fit around the neck of bottle 76, or can merely overlie the top of a paper container 78. Retainer 100 securely clamps the bottle or paper container in inner shell 24. In lieu of elastic straps 106, 108, extensible coil springs could be secured to eyelets 102, 104.

Means are also provided for adjusting the size of the interior space of inner shell 24, so that it could snugly receive a smaller bottle or paper container, such as a half gallon bottle 110.

The interior of inner shell 24 is provided with pairs of upstanding lugs 112, 114 forming a slot 116 therebetween. Two lug pairs are disposed adjacent each side wall 38, 42, as shown in FIG. 6.

A locator bar 118 is positioned transversely across the bottom of inner shell 24, and snaps into aligned slots 116 formed by lugs 112, 114 adjacent each side wall 38, 42 as shown in FIG. 3. Each locator bar 118 has an integral boss 120. A self-tapping threaded fastener 122 is adapted to be inserted through the bottom wall 44 of inner shell 24 into boss 120 to securely lock a locator bar 118 into place. With locator bars 118 in place, lateral movement of half gallon bottle 110 or half gallon container 78 is restricted, by the confinement presented by the locator bars.

If the pouring device 20 is to be used in a confined space, such as that presented between refrigerator shelves, it may be necessary to adjust the maximum elevation that the bottle or container can attain during its pivotal movement, in order to prevent interference. This can be accomplishd by removing pivot pins 62 from their location shown in FIGS. 1 to 4 and 7 and repositioning them as shown in FIGS. 5 and 6.

Outer shell 22 has a second pair of openings 124 located in opposed side walls 26, 30 directly above openings 66 and approximately midway between the top and bottom edges of the side walls. Inner shell 24 includes a second pair of openings 126 in its opposed side walls 38, 42, spaced above and rearwardly of openings 64. After pins 62 are removed, the inner shell 24 can be slid forwardly with respect to outer shell 22 until the openings 124, 126 in adjacent side walls are in alignment. Pins 62 are then inserted in the aligned openings in the same manner illustrated in FIG. 4. As shown in phantom lines in FIG. 5, inner shell 24 will tilt relative to outer shell 22, but the maximum elevation of bottle 76 during this movement is lower than that attained with the pivoted arrangement illustrated in FIGS. 1 to 4 and 7.

In operation of liquid pouring device 20, it is only necessary to pull roller 56 forwardly to tilt inner shell 24 relative to outer shell 22 and position bottle 76, bottle 110, or paper container 78 in position to have its contents dispensed. The only handling of the bottle or paper container is its initial positioning within inner shell 24.

While a specific embodiment of my invention has been disclosed in the foregoing description, it will be understood that various modifications within the spirit of the invention may occur to those skilled in the art. Therefore, it is intended that no limitations be placed on the invention except as defined by the scope of the appended claims.

What I claim is:

1. Apparatus for use in dispensing liquids from an open container comprising an outer shell having an open side, an inner shell providing an enclosed receptacle for a liquid container positioned in said outer shell, means pivotally-connecting said inner shell to said outer shell for tilting movement through the open side of said outer shell, handle means on said outer shell for carrying said apparatus, handle means on said inner shell for tilting it relative to said outer shell, and means adapted to be connected to said inner shell for retaining a liquid container in clamped relation therein, wherein said inner shell includes opposed sidewalls having a laterally-extending flange connected to the top edge thereof, and said retaining means includes a hook member disposed within a slot formed in each of said flanges, said hook member having opposed spring wire legs in frictional engagement with the side of said slot and a central U-shaped portion bent outwardly at an acute angle from the plane of said leg, and an extensible clamping member connected to the U-shaped portions of said hook members.

2. Apparatus in accordance with claim 1 wherein said outer and inner shells include opposed side walls having aligned openings, and said pivot means includes a pin between said inner and outer shells disposed within said aligned openings in said opposed side walls.

3. Apparatus in accordance with claim 2 wherein the opposed side walls of said inner and outer shells have alternate aligned openings for receiving said pin.

4. Apparatus in accordance with claim 1 wherein said extensible clamping member has an eyelet adjacent each of its ends adapted to receive the U-shaped portions of said hook members, and a pair of extensible straps between said eyelets.

5. Apparatus in accordance with claim 1 including means adapted to be placed within said inner shell for restraining lateral movement of a liquid container positioned therein.

6. Apparatus in accordance with claim 5 wherein said inner shell includes a bottom wall and said restraining means includes pairs of upstanding lugs on opposite sides of said bottom wall, and a bar extending between aligned pairs of said lugs.

References Cited

UNITED STATES PATENTS

| | | | |
|---|---|---|---|
| 550,108 | 11/1895 | Mathews | 248—141 |
| 996,658 | 7/1911 | Minor | 248—142 |
| 1,742,041 | 12/1929 | Mangold | 248—141 |
| 370,607 | 9/1887 | Chandler | 248—141 |

EDWARD C. ALLEN, Primary Examiner